United States Patent [19]

Moody

[11] Patent Number: 4,655,055
[45] Date of Patent: Apr. 7, 1987

[54] JEWELRY MOUNTING CONSTRUCTION

[75] Inventor: Leonardo Moody, Downers Grove, Ill.

[73] Assignee: Luc-Co., Inc., Chicago, Ill.

[21] Appl. No.: 832,843

[22] Filed: Feb. 24, 1986

Related U.S. Application Data

[63] Continuation of Ser. No. 728,444, Apr. 30, 1985, which is a continuation of Ser. No. 460,284, Jan. 24, 1983, abandoned.

[51] Int. Cl.⁴ .............................................. A44C 7/00
[52] U.S. Cl. .................................... 63/14 D; 403/361; 63/12; 156/294; 156/344; 29/DIG. 1; 411/303
[58] Field of Search ................... 63/14 R, 14 E, 14 D, 63/1 A, 1 R, 20, 29 R, DIG. 3; 24/150 R, 155; 411/303; 403/361; 156/294; 29/10, DIG. 1, 160.6

[56] References Cited

U.S. PATENT DOCUMENTS

| | | | |
|---|---|---|---|
| 242,422 | 6/1881 | Ballou | 63/29 R |
| 2,733,578 | 2/1956 | Tucker | 63/29 R |
| 3,053,061 | 9/1962 | French | 63/29 R |
| 3,152,820 | 10/1964 | Giampa | 403/361 |
| 3,176,475 | 4/1965 | Saccoccio | 63/14 D |
| 3,298,144 | 1/1967 | Fischer | 29/458 |
| 3,605,438 | 9/1971 | Chalson | 63/12 |
| 3,789,850 | 2/1974 | Ford | 63/12 |
| 4,003,216 | 1/1977 | Cecere | 63/14 D |
| 4,113,399 | 9/1978 | Hansen | 403/361 |
| 4,188,799 | 2/1980 | Saccoccio | 63/14 D |
| 4,218,894 | 8/1980 | Tropea | 63/29 R |
| 4,353,225 | 10/1982 | Rogers | 63/29 R |

FOREIGN PATENT DOCUMENTS 720335  5/1942  Fed. Rep. of Germany .......... 63/12

Primary Examiner—Richard J. Johnson
Attorney, Agent, or Firm—Allegretti, Newitt, Witcoff & McAndrews, Ltd.

[57] ABSTRACT

An improved jewelry mounting construction for use in adapting pierced-ear earrings into earrings capable of being clamped on unpierced ears. Also disclosed is a construction for adapting pierced-ear earrings into stickpins. The improved construction comprises a clamping mechanism for securing a medium between opposed surfaces, one of those opposed surfaces being a receptacle for an earring post, with the receptacle having a means for securing the earring post of a pierced-ear earring therein. The mechanism for adapting pierced-ear earrings into stickpins comprises a post receptacle affixed to an elongated pin, with a means for securing an earring post therein.

3 Claims, 8 Drawing Figures

JEWELRY MOUNTING CONSTRUCTION

This application is a continuation of application Ser. No. 728,444 filed Apr. 30, 1985. Application Ser. No. 728,444 is a continuation of application Ser. No. 460,284 filed Jan. 24, 1983, now abandoned.

BACKGROUND OF THE INVENTION

This invention relates to a jewelry mounting construction especially adapted for incorporation with earring clamps and stickpins, and more specifically relates to a device for converting pierced-ear earrings into earrings capable of being clamped to unpierced ears, or into a stickpin.

Earrings have traditionally been available for use in pierced ears, or in unpierced ears. Pierced-ear earrings typically consist of a decorative object attached to a pin-like post; occasionally, pierced-ear earrings consist of a decorative object attached to a hooked pin or rod. When earrings are prepared with a post, they are conventionally secured to an earlobe by inserting the post through a hole pierced through an earlobe, and thereafter clamping an anchor attachment onto the post behind the earlobe so that the post cannot be removed from the ear without removing the anchor from the earring post. Earrings produced for use on earlobes that are not pierced must employ some form of clamping means attached to a decorative object, with the clamping means used to affix the decorative object to an earlobe. Normally, pierced ear earrings cannot be used on an ear that has not been pierced.

One aspect of the current jewelry industry is that the selection of pierced ear earrings far exceeds the selection of earrings adapted for use on unpierced ears. Moreover, the majority of higher quality decorative earrings are of the pierced ear type. Hence, persons desiring to wear earrings, but unable or unwilling to have their ears pierced, have a more limited selection of earrings to choose from.

Stickpins are forms of jewelry normally consisting of a decorative object attached to a long rod or pin with a pointed end. The rod or pin is inserted through clothing, and secured underneath the clothing, thereby allowing a person's decorative jewelry to be displayed wherever a person chooses. A limited section of stickpins is, however, normally available. Moreover, stickpins are often sold as novelty items so that the quality of the decorative portion contained on a stickpin is often less than what an individual may desire.

Before this invention, persons without pierced ears who desired to use the decorative portion of a pierced-ear earring in nonpierced ear earrings, or as stickpins, were required to remove the decorative portion of the pierced-ear earring from the earring post or hook, and re-attach that decorative portion to a new clamp, such as the clamp disclosed in Saccoccio, U.S. Pat. No. 3,176,475 or to a stickpin. This is a delicate and somewhat tedious operation that usually can be accomplished only by a jeweler. Hence, persons desiring to use pierced-ear earring decorative portions have usually been required to take their chosen pierced-ear earrings to a jeweler for modification, with the delay and expense naturally attending to that action. Further, when decorative objects, such as diamonds, pearls, and delicately wrought precious metals, are removed from earrings, the operation, unless skillfully performed, may result in damage or disfiguration of the decorative portion of the earring.

An object of this invention is therefore to provide an improved jewelry mounting construction of securing a decorative item onto the body or any apparel.

A further object of this invention is to provide an improved jewelry mounting construction capable of attaching pierced-ear earrings on nonpierced ears, and capable of supporting the decorative portion of a pierced-ear earring without removing that decorative portion from the earring post.

Another object of this invention is to provide an improved jewelry mounting construction for use as a stickpin.

Still another object of this invention is to provide an improved jewelry mounting construction for use as a stickpin receptacle capable of receiving the post or straightened hook attached to the decorative portion of a pierced ear earring.

SUMMARY OF THE INVENTION

These and other objects of the invention are accomplished by providing an improved jewelry mounting construction usable with an earring clamp or a stickpin. As an earring clamp, the mounting construction comprises a receptacle for receiving a pierced-ear earring post; in the preferred embodiment, the receptacle has a generally cylindrical bore in which the earring post may be inserted. The earring clamp also includes a means for securing the earring post in the receptacle bore, and a pincer jaw adapted to clasp an earlobe between the pincer jaw and the earring post receptacle. The clamping action of the improved earring clamp is provided by a leafspring affixed to the pincer jaw, and is elastically operated through motion of a leaver attached to spanning arm between the receptacle and the pincer jaw. In the preferred embodiment, the means for securing the earring post in the post receptacle is an elastic material affixed to the interior of the post receptacle bore, so that insertion of the earring post compresses the elastic material and produces frictional resistance to sliding movement of the post within the post receptacle bore. In an alternative embodiment, the post receptacle is filled with an elastic material that is puncturable and yieldable, such as an elastomeric adhesive.

The objects of this invention are also accomplished with a stickpin embodiment comprising a elongated pin or rod with a pointed end, and a second end affixed to a tubular earring post receptacle. The earring post receptacle has a means for securing the earring post in the receptacle, and the stickpin further comprises a pin retention attachment mountable on the pin at the stickpin's pointed end, to secure the stickpin in place when the stickpin has been attached to clothing or the like. In the preferred embodiment, the means for securing the earring post in the post receptacle comprises an elastic material affixed within the the center of the tubular post receptacle, so that insertion of the earring post into the post receptacle compresses the elastic material and produces frictional resistance to sliding movement of the earring post in the post receptacle.

BRIEF DESCRIPTION OF THE DRAWINGS

Two embodiments of the present invention are disclosed in the detailed description and drawings. The drawings include 6 figures to illustrate both embodiments, wherein like reference numerals in each drawing refer to like parts of the various embodiments. The drawings are briefly described as follows.

In the detailed description, directional terms such as "upper", and "lower" and the like, are used to relate the invention to the earlobe of a person oriented in the normally erect position. Terms of this type are used for the convenience of the person of ordinary skill in the art, and are not to limit the scope of any patent issuing on the present invention, unless expressly included in the claims.

DETAILED DESCRIPTION OF THE PREFERRED EMBODIMENT

The present invention is a mounting construction for mounting jewelry on a persons body, or on an item of apparel. The jewelry is of the kind having a straight post for a support. Generally, the invention comprises a receptacle for receiving the support post of a piece of jewelry, and an attachment means for attaching the receptacle and jewelry to a part of the body, or to apparel. The receptacle is connected to the attachment means by being affixed to a support stud affixed to the attachment means.

Figure 1:
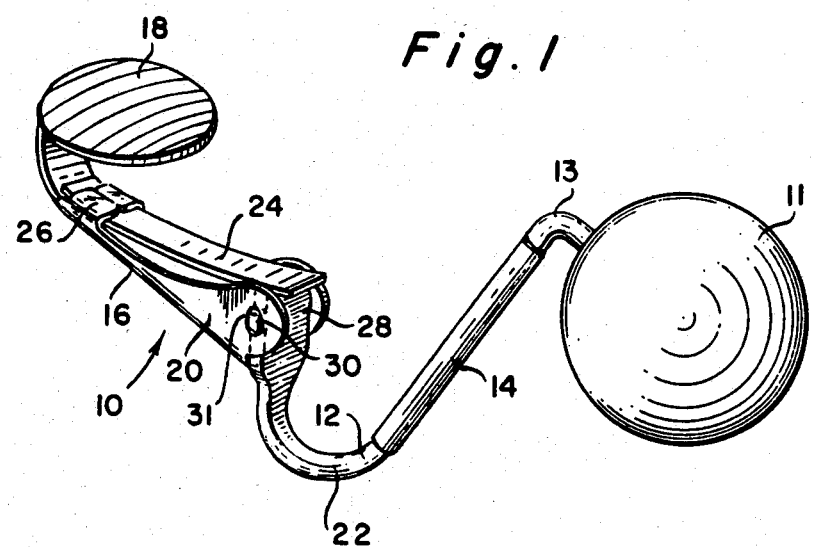
FIG. 1 is a side perspective view of the preferred embodiment of the invention depicting the improved earring clamp with a tubular earring post receptacle.
Figure 2:
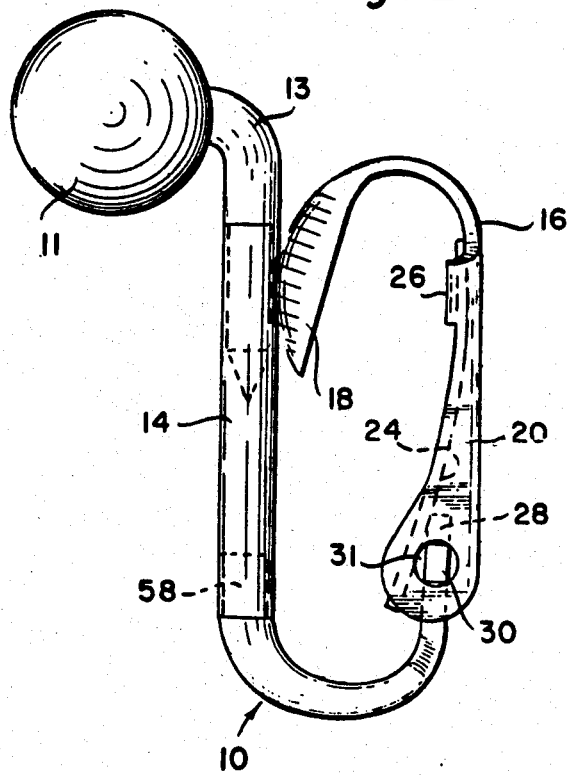
FIG. 2 is a side elevation of the earring clamp depicted in FIG. 1, showing operation of the leafspring mechanism.
Figure 4:
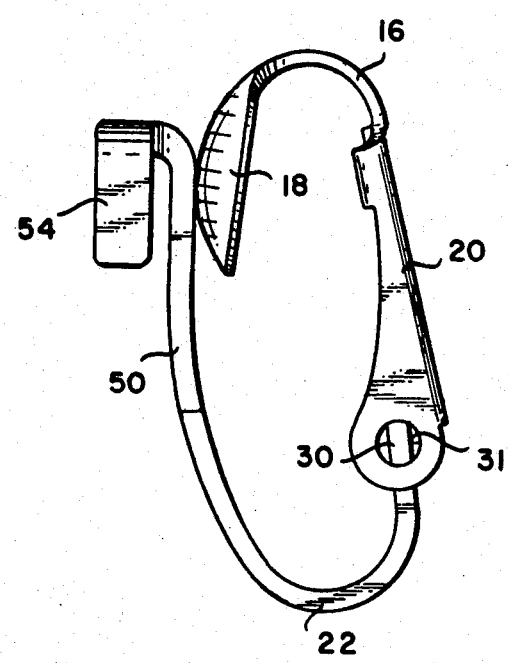
FIG. 4 is a side elevation of a second embodiment of the improved earring clamp.
Figure 5:
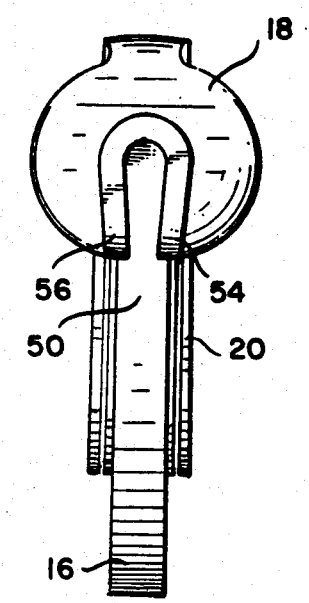
FIG. 5 is a front plan view of the second embodiment depicted in FIG. 4.
Figure 6:
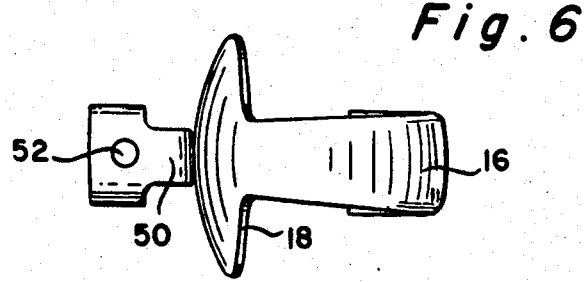
FIG. 6 is a top plan view of the second embodiment depicted in FIGS. 4 and 5.

Referring to FIGS. 1 and 2 of the accompanying drawings, a preferred embodiment of the present invention is incorporated in an earring clamp 10, so that the attachment means comprises a clamp for attaching jewelry to an earlobe. An alternative embodiment of the invention is shown in FIGS. 4, 5, and 6. The embodiment of FIG. 1 is regarded as the preferred mode of carrying out this invention. The earring clamp 10 is attached to a decorative jewelry piece 11, with a post 13.

The improved clamp can be set in two positions. The earring clamp 10 is shown in FIG. 1 in an open, or "cocked" position, and in FIG. 2 in a closed or "clamped" position. The earring clamp 10 includes a projecting stud 12, a post receptacle 14, and a pincer jaw 16. The pincer jaw 16 includes a contact surface 18 and a shank 20. The pincer jaw 16 is connected to the post receptacle 14 by a U-shaped spanning arm 22, the connecting portion of the spanning arm 22 being the projecting stud 12. The spanning arm 22 is inserted by the projecting stud 12 into the lower end of the post receptacle 14, and glued or soldered therein. The pincer jaw 16 with contact surface 18 and shank 20 comprises the attachment means for the mounting construction.

The spanning arm 22 is the stud projecting from the attachment means and affixed to the receptacle, shown as post receptacle 14.

The earring clamp 10 is operated through use of a leafspring 24. The leafspring 24 is attached to the shank 20 at the shank's upper end by a clamp 26. The leafspring 24 interacts with the spanning arm 22, both to secure the pincer jaw 16 in an open or "cocked" position, and to exert pressure by the contact surface 18 against an earlobe when the pincer jaw 16 is in the closed position on an ear.

The leafspring 24 operates through pressure on a lever 28 extending from the spanning arm 22 as a continuation of spanning arm 22. The spanning arm 22 is pivotally connected to the pincer jaw 16 through axle arms 30 inserted through pivot holes 31. The leafspring 24 exerts pressure on the lever 28, thereby acting to restrain the lever 28 in a position roughly parallel to the shank 20. When the lever 28 is rotated in the pivot holes 31, the lever 28 is restrained in a position perpendicular to the shank 20, thereby lifting the leafspring 24 and "latching" the lever 28 against leafspring 24. Latching occurs when the lever 28 is perpendicular to the leafspring 24, so that the leafspring 24 cannot exert rotational force on the lever 28.

Figure 3:
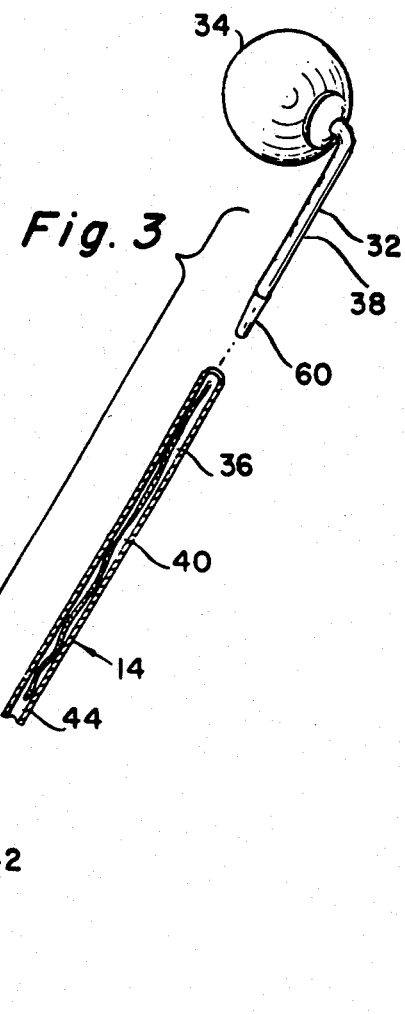
FIG. 3 is a cutaway, side perspective view of the tubular post receptacle, depicting how a pierced-ear earring with an earring post may be inserted into the post receptacle to form a stickpin.

Referring to FIG. 3, the post receptacle 14 is shown in cutaway, and before attachment of the post receptacle to an earring post. FIG. 3 also illustrates an earring post 32 attached to the decorative portion 34 of an earring. FIG. 3 further illustrates a means for releasably securing an earring post 32 within the post receptacle 14. In the preferred embodiment, that means comprises a portion of an elastic, compressible material 36 affixed to the inner surface of the post receptacle 14. In the preferred embodiment, the compressible material is a strand of flexible, compressible fiber, such as polyurathane or plastic fiber. FIG. 3 therefore shows that the earring post 32 may be inserted into the post receptacle 14, causing a friction fit between the outer surface 38 of an earring post and the inner surface 40 of the earring post receptacle. The compression fit also operates through interaction between the outer surface 38 of the earring post and the compressible material 36.

FIG. 3 further illustrates use of the invention as a stickpin. The attachment means is a pin 42 sized to be slidably inserted into the lower end 42 of the post receptacle 14. The pin 42 has a tapered or pointed end 46 so that the pin 42 may be used as the portion of a stickpin that is inserted through clothing or other puncturable material. The upper end 48 of the pin 42 comprises the projecting stud of the attachment means and is therefore insertable in the lower end 44 of the post receptacle. In the preferrred embodiment, the upper end 48 is secured within the post receptacle by means of an adhesive bonding agent such as glue. In alternative embodiments, the upper end 48 of the pin 42 can be secured to the lower end 44 of the post receptacle 14 by means of solder, or any other securing means.

Referring to FIGS. 4, 5, and 6, an alternative embodiment is displayed for the post receptacle 14, particularly for use with earrings. FIG. 4 illustrates a side view of an alternative embodiment 50 of the post receptacle. That alternative embodiment consists of a body 50 attached to the spanning arm 22. As shown in FIG. 5 and FIG. 6, the body 50 has an upper end portion which is U-shaped and the bight of the U-shape defines a earring post hole 52 in which an earring post may be inserted. The earring post hole 52 is oriented so that an earring post inserted through the hole 52 will be aligned parallel to the shank 20 of the pincer jaw 16 when the clamp is in the closed position. As shown in FIG. 5, the legs of the U-shape at the end of body 50 are formed by opposed gripper arms 56 and 54 depending from the portion of the body 50 defining the hole 52. The gripper arms 54 and 56 are positioned in opposed relationship, so that when an earring post, such as that illustrated as 32 in FIG. 3, is inserted through the hole 52, the earring post 32 is aligned approximately parallel to the gripper arms 54 and 56, and is thereby gripped by the lower portions of the gripping arms 54 and 56, to secure the post 32 within the gripper arms 54 and 56.

FIGS. 4, 5, and 6 further illustrate that the alternative embodiment 12 of the earring clamp operates through clamping action upon an ear or other material, with that clamping action applied by the body 50 and contact surface 18 of the pincer jaw 16. As in the preferred embodiment, the alternative embodiment receives its clamping action through operation of a leafspring (not shown) acting on the upper, pivot portion of the spanning arm 22. The pivot portion comprising a pivot hole 31 enclosing a axle arm 30. Again as in the preferred embodiment, the pincer jaw 16 may be latched in the open position, or the closed position as is shown in FIG. 4.

FIG. 3 further illustrates the method by which a pierced-ear earring may be converted to an earring suitable for use on unpierced ears, or to a stickpin. Considering FIG. 3 and FIG. 2, a method of converting pierced earrings begins by providing a clamp such as disclosed in FIG. 2; however, the clamp will not have the post receptacle 14, but would instead have an extended portion (not shown) of the spanning arm 22 constituting a clamping surface opposed to the contact surface 18. The extended portion of the spanning arm 22 is thereafter removed, leaving a clamp, such as is shown in FIG. 2, without the post receptacle 14. An earring post receptacle such as is shown in FIGS. 2 and 3 as 14 is then connected to the severed end 58 of the spanning arm 22. The earring post receptacle 14 is then securely affixed to the severed end 58 of the spanning 22, preferably by use of an adhesive bonding agent. Next, a means is provided for securing an earring post in the earring post receptacle 14. In the preferred embodiment, the means comprises a compressible material 36, such as a strand of polyurathane or plastic fiber, glued to the inner surface 40 of the post receptacle 14. The post receptacle 14 may also be sized for a simple friction fit between the outer surface 38 of the earring post and the inner surface 40 of the earring post receptacle. Thereafter, an earring must be prepared for insertion within the post receptacle 14, so that the decorative portion 34 of that earring may be properly displayed. In the preferred embodiment, this preparation comprises bending the earring post so that the decorative portion of the earring 34 is disposed away from the earring post 32. The preparation may also include tapering the lower end 60 of the earring post 32, to ease insertion of the earring post 32 into the post receptacle 14. If the pierced-ear earring has a hook, rather than a post, the hook must be mechanically straightened to form a post.

Figure 7:
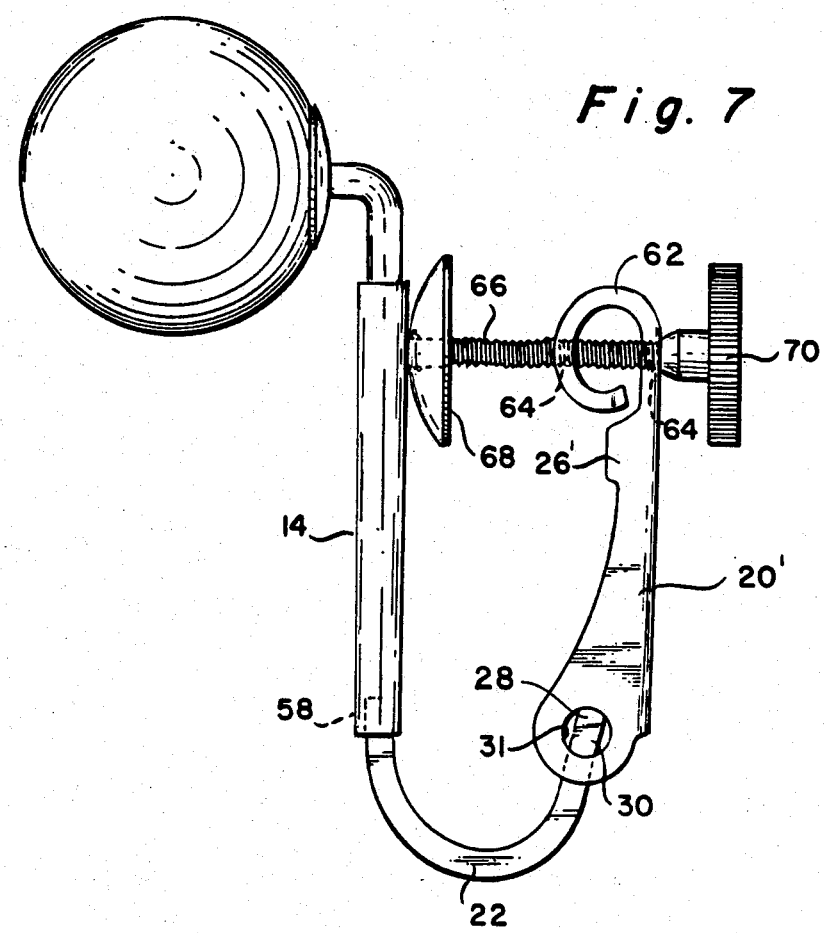
FIG. 7 is a side perspective view of a third embodiment of the improved earring clamp.

Referring to FIG. 7, a further alternative embodiment of the earring clamp is illustrated. Like the preferred embodiment, the embodiment illustrated in FIG. 7 contains a post receptacle 14 fixed to the severed end 58 of the spanning arm 22. Also as in the preferred embodiment, the alternative embodiment shown in FIG. 7 uses a lever 28 on the end of the spanning arm 22 interacting with the leaf spring to urge a shank 20 against the post receptacle 14; the leaf spring 24 is also attached to the shank 20 by a clamp 26, and the shank 20 rotates about axle arms 30 on the end of spanning arm 22, with the axle arms 30 extending through pivot holes 31 in the shank 20.

The alternative embodiment displayed in FIG. 7 differs from the preferred embodiment in that the upper end of the spanning arm 20 comprises a loop 62 pierced by a threaded bore 64 in the opposed sides of the loop. A tightening bolt 66 is threaded through the threaded bore 64 so that rotation of the tightening bolt urges the bolt towards or away from the post receptacle 14 when the shank 20 is in the closed position. A contact surface 68 is affixed to the tightening bolt 66 at its end nearest the post receptacle 14. A tightening handle 70 is affixed to the tightening bolt 66 at the tightening bolt's opposite end. In operation, manual rotation of the tightening handle 70 urges the tightening bolt 66 and contact surface 68 towards or away from the post receptacle 14, thereby increasing or decreasing the clamping pressure between the post receptacle 14 and the contact surface 68 when the shank 20 is in the closed position and the clamping mechanism is clamped on a body portion such as an ear lobe.

Figure 8:
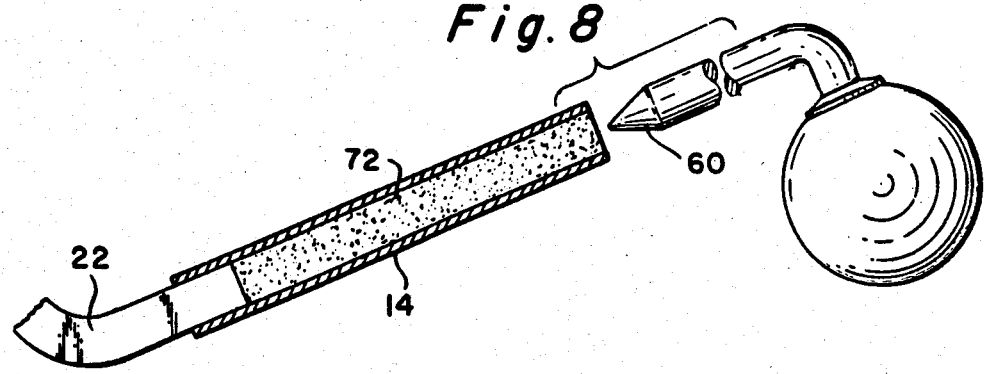
FIG. 8 is a cutaway, side perspective view of a second embodiment of the tubular post receptacle and means for securing an earring post in the receptacle.

Referring to FIG. 8, an alternative embodiment of the means for securing the earring post to the post receptacle is illustrated. As in the preferred embodiment, the alternative embodiment shown in FIG. 8 includes a spanning arm 22 affixed within the post receptacle 14. Unlike the preferred embodiment, the friction means for securing the earring post 60 in the post receptacle 14 is a yieldable and puncturable elastic material such as an adhesive 72 inserted within the post receptacle 14. The adhesive 72 is preferably a silicone glue, such as is commonly used in many household adhesive compounds. Embodiments of the invention sold by the inventor use a silicone glue manufactured by the General Electric Company and sold under the name "Silicone Clear Household Glue & Seal". Such adhesives do not remain "tacky" after hardening. The adhesives also only partially harden, and remain soft enough after hardening to be puncturable and yieldable. Insertion of an earring post 60 in the post receptacle 14 then displaces portions of the adhesive 72, creating a friction fit between the outer surface of the earring post 60 and the inner surface of the post receptacle 14, thereby securing the earring post 60 against longitudinal movement within the post receptacle 14.

While preferred embodiments of the present invention have been set forth in the above detailed description, it is to be understood that the invention is limited only by the following claims and their equivalents.

What is claimed is:

1. An improved jewelry mounting construction for adapting pierced-ear earrings having a generally linear smooth sided earring post for use in unpierced ears, comprising, in combination:
   receptacle for the pierced-ear earring post, the receptacle defining a bore, compatible with the earring post, in which the earring post may be slidably inserted and slidably removed the receptacle further comprising a tube section defining the bore, the bore being cylindrical and central to the tube section, and further being adapted for slidable insertion of a portion of the post into the tube section;

means for securing the earring post in the receptacle bore to restrain sliding movement by the post in directions generally parallel to longitudinal axis of the post, said means comprising an elastic material contained in the receptacle and affixed to the bore's inner surface to secure the post in the receptacle by a friction fit between the post and the bore's inner surface;

a pincer jaw disposed opposite the post receptacle, the pincer jaw having a shank with an upper and lower end, the pincer jaw further having a contact surface affixed to the shank at the shank's upper end, the contact surface being adapted for pressure contact with an ear lobe;

a leaf spring with a restrained end and a free end, the leaf spring being affixed at the restrained end to the shank near the connection of the contact surface to the shank's upper end, the leaf spring further being disposed to extend longitudinally along and parallel to the shank;

a spanning arm connecting the earring post receptacle to the pincer jaw, the spanning arm having a fixed end and a pivot end, the spanning arm also having a pivot point at the pivot end, the earring post receptacle being affixed to the spanning arm at the spanning arm fixed end, and the pincer jaw being pivotally connected to the spanning arm at the pivot end of the spanning arm, the connection to the pincer jaw being to the shank's lower end and further being connected about the pivot point in the spanning arm pivot end, the pincer jaw being disposed to pivot in a single plane about the pivot point, the pincer jaw further being pivotable between a first, open position with the pincer jaw angled away from the post receptacle, and a second, closed position with the pincer jaw in close proximity to the receptacle and with the shank of the pincer jaw being substantially parallel to the post receptacle when the pincer jaw is in the closed position, the tube section of the post receptacle being affixed to the spanning arm fixed end;

a lever affixed to the spanning arm's pivot end and extending from and beyond the pivot point, the lever being generally parallel to the post receptacle and disposed between the leaf spring free end and the pincer jaw shank lower end, the lever being generally parallel to the leaf spring and shank when the pincer jaw is in the second, closed position, the lever forming an approximate right angle with the pincer jaw when the pincer jaw is pivoted about the pivot point by approximately ninety angular degrees, the lever adapted to latch the leaf spring free end and shank lower end when the shank and pincer jaw are in the first, open position, whereby an earring post with an attached decorative piece may be inserted into the post receptacle and restrained therein, and the resulting combination of earring post, decorative piece and earring clamp may be removably affixed to an ear by clamping the ear lobe between the pincer jaw and earring post receptacle, with the leaf spring acting to urge the opposed surfaces of the pincer jaw and post receptacle together in clamping action on the ear lobe when the pincer jaw is in the closed position, and the earring clamp may be latched conveniently open with the pincer jaw in the open position during attachment of the earring clamp to the ear lobe.

2. An improved jewelry mounting construction, said construction adapted to receive and retain a generally linear smooth sided jewelry support post supporting pierced-ear earrings having a decorative piece, said construction comprising, in combination:

an attachment means for attaching the mounting construction as a piece of jewelry to an ear, said attachment means including a projecting support stud;

receptacle means mounted on the stud and extending from the stud, said receptacle means including an opening to receive the jewelry support post, said opening further comprising a generally cylindrical passage for receipt of the jewelry support post, with the cylindrical passage defining a central bore running longitudinally through the opening, the inside of the cylindrical passage being adapted to slidably receive the post, the support stud being fixedly attached to the receptacle, the cylindrical passage extending from the projecting support stud a distance sufficient to support the post, said receptacle means including means adapted for detachable connection of the jewelry support post from the receptacle means and means for securing the post in the post receptacle, said means for securing being a friction means comprising an elastic material contained within the post receptacle and affixed in the cylindrical passage, with the cylindrical passage further comprising smooth sides, the elastic material further comprising an elastomeric silicone adhesive, and the attachment means further comprising a mechanism adapted to clamp onto an ear lobe and releasably secure the jewelry support post to an ear without the post penetrating the ear, whereby receipt of the post into the opening in the receptacle means detachably connects the jewelry to the attachment means so that a choice of jewelry may be mounted on an ear.

3. A construction for adapting a pierced-ear earring for attachment to non-pierced ears when the pierced-ear earring is of the kind having a linear post for insertion through an ear lobe, the construction comprising, in combination:

a receptacle for the post, the receptacle being configured as a linear tube having a central linear bore and being adapted at one end to receive the earring post, the receptacle's bore containing an elastic material that compresses upon insertion of the post into the receptacle and retains the post within the receptacle by a friction fit; and means for clamping the receptacle to an ear lobe, the means for clamping further comprising:

a pincer jaw disposed opposite the post receptacle, the pincer jaw having a shank with an upper and lower end, the pincer jaw further having a contact surface connected to the shank at the shank's upper end, the contact surface being adapted for pressure contact with a pliable clamped medium such as an ear lobe;

a leaf spring with a restrained end and a free end, the leaf spring being affixed at the restrained end to the shank near the connection of the contact surface to the shank's upper end, the leaf spring further being disposed to extend longitudinally along and parallel to the shank;

a spanning arm connecting the earring post receptacle to the pincer jaw, the spanning arm having a fixed end and a pivot end, the spanning arm also having a pivot point at the pivot end, the earring post receptacle being affixed to the spanning arm at the spanning arm fixed end, and the pincer jaw being pivotally connected to the spanning arm at the pivot end of the spanning arm, the connection to the pincer jaw being to the shank's lower end and further being connected about the pivot point in the spanning arm pivot end, the pincer jaw being disposed to pivot in a single plane about the pivot point, the pincer jaw further being pivotable between a first, open position with the pincer jaw angled away from the post receptacle, and a second, closed position with the pincer jaw in close proximity to the receptacle and with the shank of the pincer jaw being substantially parallel to the post receptacle when the pincer jaw is in the closed position;

a lever affixed to the spanning arm's pivot end and extending from and beyond the pivot point, the lever being generally parallel to the post receptacle and disposed between the leaf spring free end and the pincer jaw shank lower end, the lever being generally parallel to the leaf spring and shank when the pincer jaw is in the second, closed position, the lever forming an approximate right angle with the pincer jaw when the pincer jaw is pivoted about the pivot point by approximately ninety angular degrees, the lever being adapted to latch the leaf spring free end and shank lower end when the shank and pincer jaw are in the first, open position, whereby an earring post with an attached decorative piece may be inserted into the post receptacle and restrained therein, and the resulting combination of earring post, decorative piece and earring clamp may be removable affixed to an ear by clamping a portion of the ear between the pincer jaw and earring post receptacle, with the leaf spring acting to urge the opposed surfaces of the pincer jaw and post receptacle together in clamping action on the ear when the pincer jaw is in its closed position, and the earring clamp may be latched conveniently open with the pincer jaw in the open position during attachment of the earring clamp to the ear.

* * * * *